United States Patent [19]

Guyder

[11] Patent Number: 4,907,164
[45] Date of Patent: Mar. 6, 1990

[54] AUTOMATICALLY OPTIMIZED NC TOOL PATH GENERATION FOR MACHINING

[75] Inventor: Margaret K. Guyder, Delanson, N.Y.

[73] Assignee: General Electric Company, Schenectady, N.Y.

[21] Appl. No.: 248,751

[22] Filed: Sep. 26, 1988

[51] Int. Cl.$^4$ .............................................. G06F 15/46
[52] U.S. Cl. ........................... 364/474.15; 364/474.2; 364/474.24; 364/474.29
[58] Field of Search ........... 364/474.15, 474.2, 474.24, 364/474.26, 474.29, 188–193, 512; 318/568.1

[56] References Cited

U.S. PATENT DOCUMENTS

| | | | |
|---|---|---|---|
| 4,618,924 | 10/1986 | Hinds | 364/191 |
| 4,736,306 | 4/1988 | Christensen et al. | 364/474.24 X |
| 4,757,461 | 7/1988 | Stohr et al. | 364/512 X |
| 4,792,889 | 12/1988 | Kragelin et al. | 364/474.24 X |
| 4,833,617 | 5/1989 | Wang | 364/474.15 X |

OTHER PUBLICATIONS

A. A. G. Requicha and H. B. Voelcker, "Solid Modeling: a Historical Summary and Historical Perspective", IEEE Computer Graphics and Applications, Mar. 1982, 9–24.

Primary Examiner—Joseph Ruggiero
Attorney, Agent, or Firm—Paul R. Webb, II; James C. Davis, Jr.

[57] ABSTRACT

A method is presented to generate 2D tool paths and to optimize the ordering of these tool paths for 2½ axis milling of cavities for molds and dies. All motion of the cutting tool is dictated and the number of retractions is reduced to a minimum without violating a prechosen set of ordering guidelines. Predrill locations for tool plunges are specified. A 3D solid model of the cavity region with optional islands, avoidance and containment regions is constructed and a planar section through the model forms a closed curve with nested and disjoint loops. Successive inset curves are taken until there are no arcs in the curve. An ordered list of roughing tool paths is generated with a retraction indicated when necessary to prevent gouging, and finishing tool paths are augmented with tangential approach and exit arcs and milled last.

17 Claims, 9 Drawing Sheets

Fig. 2
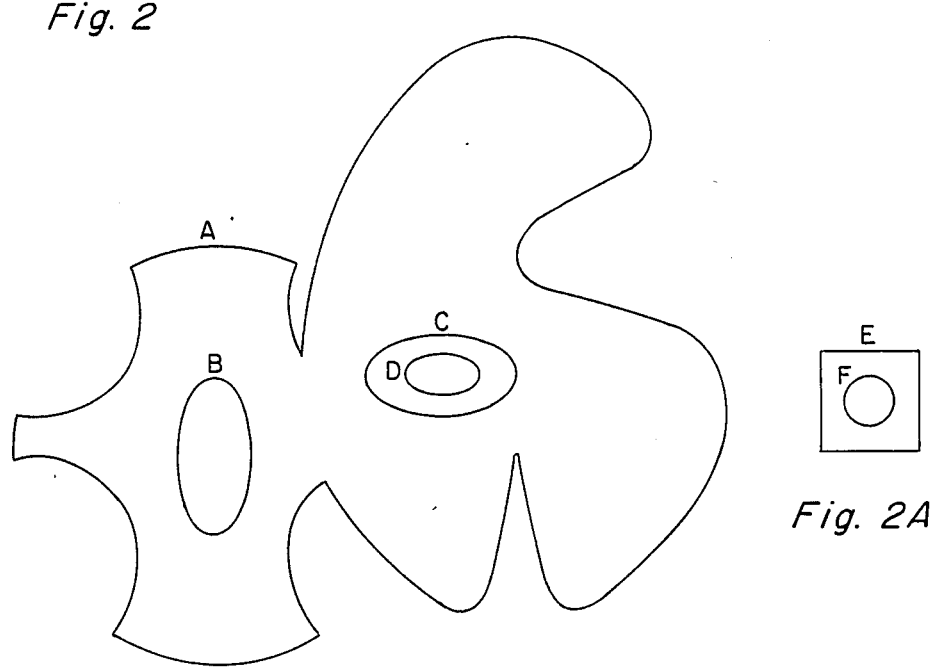
Fig. 2A
Fig. 3
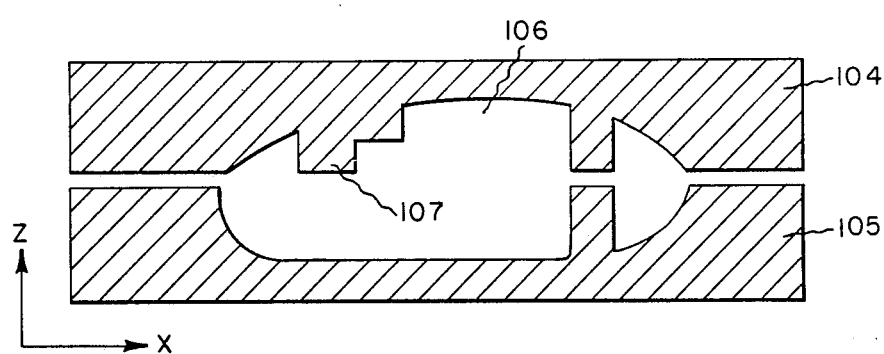

AUTOMATICALLY OPTIMIZED NC TOOL PATH GENERATION FOR MACHINING

BACKGROUND OF THE INVENTION

This invention relates to a method based on solid modeling for automatically generating tool paths to achieve more efficient milling.

Efficient 2½-axis milling is the key to fast production and cost reduction in the milling of molds and dies. In this type of machining the z depth is set and all tool motion is in the x and y planes, another z depth is set and so on. For any one set of tool paths, z is constant. Efficiency requires accurate tool paths, a minimized number of tool retractions, and automation with flexibility. Solid modeling systems can define parts to be milled, and milling machines can follow programmed paths faithfully, but the step from a solid model to an optimized process for automatically generating the numerical control (NC) code has been lacking and is addressed by this invention.

A solid model of a part to be machined may be constructed in a computer using the principles of constructive solid geometry by adding and subtracting a basic set of primitive shapes; this is explained in U.S. Pat. No. 4,618,924 - J. K. Hinds. After the model is defined by means of boolean operations on solids, the stock from which the model is to be milled, and avoidance and containment regions must be modeled. A typical avoidance region is a clamp to hold the workpiece, which can push against the sides of a workpiece or can clamp over the top of it. In either case, the centerline of a milling tool cannot move along the edge of a workpiece in the region of the clamp without milling the clamp. Containment regions may be needed when milling complex surfaces where it is necessary to generate one setup, mill a portion of the part, change the setup and mill a portion, etc. For each setup only a portion of the part is milled. Such an approach cannot be accomplished unless the system allows the user to define containment regions for each setup. Having the conglomerate model, part plus stock plus avoidance and containment regions, maximum and minimum z levels are identified from the conglomerate, and planar sections are passed through the workpiece from the maximum to the minimum level as discussed by Hinds. Tool paths are defined for each planar section, and the aggregate of these tool paths define the motion for the tool in the milling process. Thus the central problem to be solved involves the definition of optimal tool paths and retraction requirements on a single plane.

It is a simple matter to accumulate the optimized results as they are obtained on successive planes. The conglomerate defines the total milling process, which can be used with any milling machine. Machine code for a specific milling machine is generated in a post processing phase since each machine requires its own code format.

Tool paths are curves that describe the route for the centerline of the tool. Since the tool has a diameter, at all times these centerlines must maintain a minimum distance of the tool radius from the boundaries. In addition to the tool radius (HRAD), the user must be able to specify the distance between tool paths (STEPOVER) and extra thickness desired on the finished boundaries (THICK). All tool paths generated must honor these distance requirements within a fine tolerance.

The NC optimization process being described defines the generation of gouge-free tool paths on a single plane, optimizes the ordering of tool paths, and specifies required retractions. It optimizes the process of milling cavities which define the mold or die for forging parts. All tool paths are contained within the cavity. The workpiece surrounds the cavity and is of size and shape suitable for the purposes of the forging operation, but is not of concern for this invention. Hence the workpiece is shown only once and as a rectangular slab in the figures.

A consideration is that the cavity to be milled is of arbitrary shape and may have deep, concave portions and/or narrow strictures. As the tool paths are generated, major challenges arise with maintaining data concerning the position of each tool path relative to the others to determine accessibility of the tool from one path to another without gouging. The technique developed involves establishing algorithmic rules to nest, or group, certain sets of tool paths and then deriving another set of algorithmic processes to mill these nests in an expedicious manner while honoring milling guidelines and minimizing the number of required retractions. These algorithmic processes are the essence of the invention.

Constant interference checking is mandatory to prevent gouging of the boundaries. A problem in the development of this process is the handling of avoidance and containment regions. Another consideration is that pocketing tool paths, which are closed loop tool paths to clear material inside cavity boundaries, are generated for flat-end cutters only. Paths are also appropriate for ball-end cutters when the curve is a section cut of an offset surface. Thus the optimized system needs a mechanism for knowing when the part is an offset surface.

Finishing curves are tool paths closest to cavity boundaries. Quality molds require smooth boundaries, which puts constraints on the manner in which a cutting tool approaches and leaves finishing paths. Predrilling and straight line motion from neighboring arcs can cause dwell marks where the tool is deflected and seats in a location before traversing a boundary. To prevent this, the process should augment all finishing curves with tangential approach and exit arcs, and determine that there is sufficient room for the cutter tool diameter at all points of the augmented curve.

SUMMARY OF THE INVENTION

An object of the invention is to automate optimal milling especially for clearing material within cavities for molds and dies.

Another object is to define the tool motion for milling a cavity on a plane by automatically generating the geometric representation of all tool paths and of tool motion between tool paths, provide the ordering of tool paths to accomplish optimal milling, limit retractions of the milling tool, and specify predrill locations for required tool plunges.

Yet another object is to provide for containment regions to which milling is restricted and avoidance regions where milling is prohibited.

Still another object is to isolate finishing tool paths from roughing tool paths, and augment the former with tangential approach and exit routes.

According to one aspect of the invention, a method of generating optimized tool paths for milling mold and die parts with a cutting tool comprises providing a three-dimensional solid model of a part cavity to be milled, which optionally has one or more islands that are not milled, and taking a planar section through the model and obtaining a closed curve which describes boundaries of the cavity and has a plurality of loops oriented such that material to be cut is on the left. A first inset of the section curve is obtained, each loop of which is a finishing tool path across which the cutting tool cannot move without gouging and each starting a nest of tool paths. Other inset curves are generated repeatedly that are a constant distance from the previous inset; each loop is a roughing tool path and is a member of one nest or starts a new nest. This process stops when a last inset curve has no arcs. The roughing tool paths are ordered in an optimized sequence to mill the cavity so as to follow a set of ordering guidelines while minimizing retractions of the tool to go to another roughing tool path, and tool motion paths to move between roughing tool paths are generated. The finishing tool paths are then augmented with tangential approach and finish arcs.

Other features of the method are that all of the tool paths are numbered in sequence so that innermost tool paths have the highest numbers, and a nest is milled from innermost to outermost tool paths unless an ordering guideline is violated. A list of numbered tool paths is outputted in the order to be milled separated by a retraction symbol, and a list of predrill locations at starting points of the tool paths where the cutting tool plunges from a retract position.

Additional features of the step of ordering tool paths in an optimized sequence are that the tool motion paths between roughing tool paths are straight lines. Frequent interference checks are made to determine that there is no intersection with the first inset curve, with an unmilled nest of tool paths, and with an about-to-be-milled tool path except at a starting point. The ordering guidelines were generated as part of this invention and are: (a) gouge free milling is required, (b) prevent milling both sides of one tool path before milling the tool path itself, (c) prevent cutting all or part of one tool path more than once, (d) mill the tool paths that are innermost first, (e) finishing tool paths are milled separately from roughing paths and last, (f) the tool intersects the path-to-be-milled only at the starting point, (g) the tool intersects no unmilled nest of tool paths, and (h) the tool may cross milled nests of tool paths.

Another aspect of the invention is that the tool path optimization procedure makes provision for containment and/or avoidance regions. A 3D solid model of the part cavity is constructed and of the containment and avoidance regions, and a milling region is formed by intersecting the cavity and any containment region and obtaining the Volume common to both, and subtracting therefrom any avoidance region. The method after this initial step is the same; there is no change in the nesting and optimization algorithms.

BRIEF DESCRIPTION OF THE DRAWINGS

FIG. 2 shows a closed curve comprising four loops.

FIG. 2A shows a closed curve comprising two loops.

FIGS. 2 and 2A show one closed curve comprising six loops.

FIG. 3 is a simplified cross section through a mold illustrating the cavity to be milled.

DETAILED DESCRIPTION OF THE INVENTION

Figure 1:
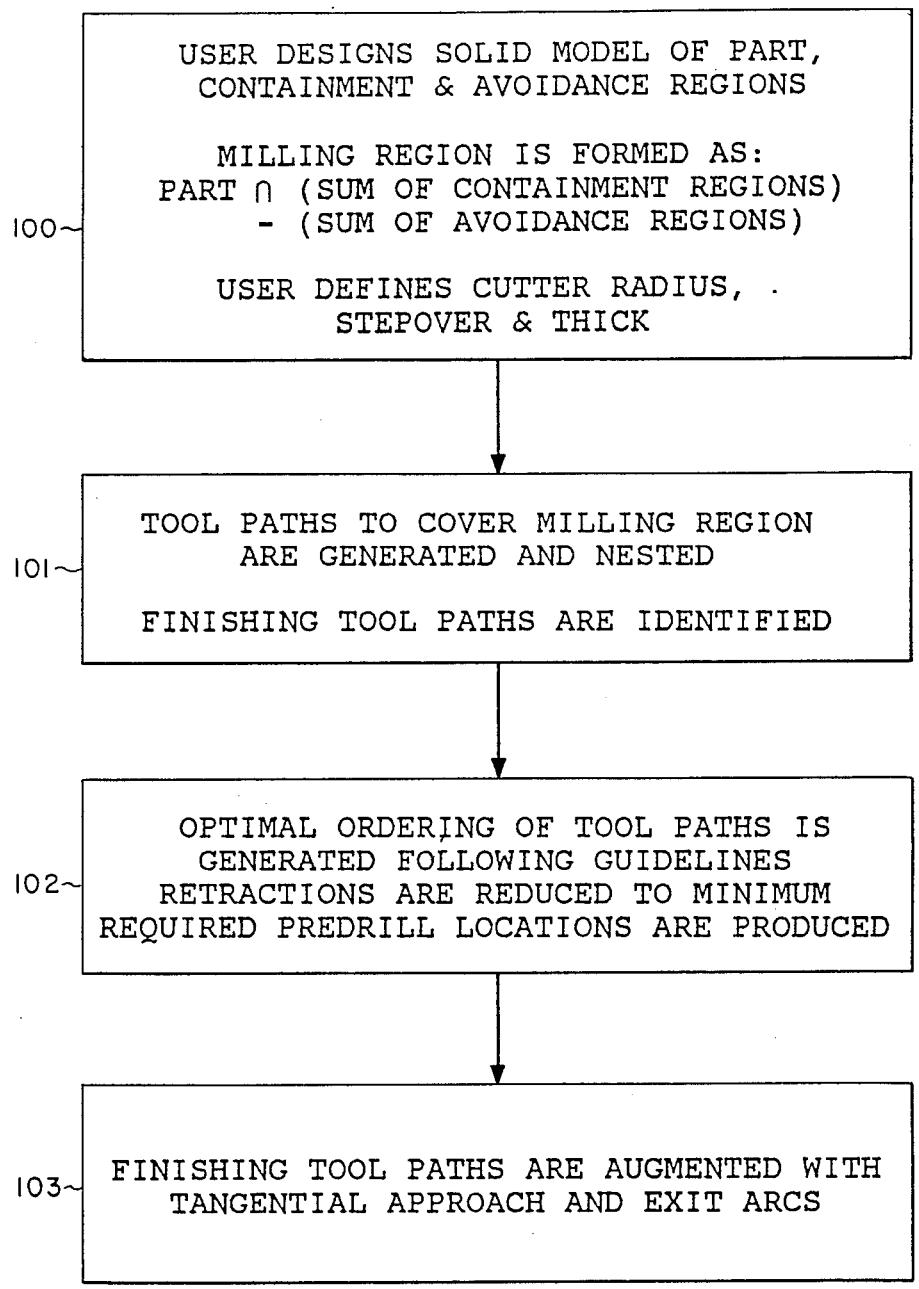
FIG. 1 is a flowchart giving an overview of the tool path optimization procedure.

The major steps of the optimizing process are given in boxes 100–103 in FIG. 1. The user designs a computerized solid model of the part and any containment and avoidance regions. The construction of a solid model using a solid modeling system is explained in U.S. Pat. No. 4,618,924, the disclosure of which is incorporated herein by reference. Although other solid modelers may be used, the preferred solid modeling system is General Electric's TRUCE (Tri-Dimensional Rational Unified Cubic Engine), which is described in the TRUCE User's Manual, July 1984. A milling region is formed as the boolean intersection of the part and the sum of any containment regions minus the avoidance regions. The intersection operation provides the volume common to both the part and the containment regions. The user defines the cutter radius, the STEPOVER distance between roughing tool paths, and a THICK dimension if a prescribed thickness is to be left on the surface of the part.

Tool paths to cover the milling region are generated and nested, and finishing tool paths are identified. For 2½ axis milling, this is done at a series of planar section cuts through the model at different heights. An optimal ordering of the tool paths is generated following a set of ordering guidelines. Retractions of the cutting tool are reduced to the minimum required, and predrill locations at which the cutter plunges to begin milling are produced. The finishing tool paths are augmented with tangential approach and exit arcs to prevent dwell marks. The conglomerate of tool paths from the consecutive section levels define the milling process.

When it is stated that the geometric modeling system generates a model, the modeler generates a mathematical representation of that model which is stored in the memory of the computer. All operations on the model, such as will be described later, are mathematical operations on this internal representation. Plots and pictures can be generated, but algorithms make no use of the physical rendering of the model, and perform mathematical and logical operations on the internal representations. The TRUCE modeler used to implement the optimization process utilizes the well known Coons geometric representation for curves, sculptured surfaces and solids; D.V. Ahuja and S.A. Coons, "Interactive Graphics in Data Processing—Geometry for Construction and Display", IBM Systems Journal, Nov. 3 and 4, 1968. The behavior of x, y and z along arcs of a curve and paths of a surface is expressed in terms of rational cubic polynominals, parameterized on the interval [0.0, 1.0]. A z-level section through a model, i.e. the intersection of a plane z=constant with a solid, is a 2D curve with only x and y varying.

The terms used in describing the invention are defined in Appendix A, and a few of them are as follows. A curve is a collection of arcs. A loop is a continuous. non-self intersecting, closed chain of arcs which defines an area. Disjoint loops are loops with no area in common. In FIG. 2, loops A, B, C and D are disjoint from loops E and F. Nested loops are a set of loops that for each pair one is completely inside the other. Considering the pair A-D, loop D is nested inside loop A and loop A encloses D. Loop F is nested inside loop E. A closed curve is a set of nested and/or disjoint loops; it may have loops inside loops to any depth. FIG. 2 shows one closed curve comprising six loops. The orientation of a loop is the direction, clockwise or counterclockwise, traveled along that loop as consecutive arcs are traversed. A positive or counterclockwise nest is a list of counterclockwise loops such that each loop (except the first) is entirely enclosed by its predecessor. A negative or clockwise nest is a list of clockwise loops such that each loop (except the first) entirely encloses its predecessor. Either of these nests may consist of a single loop.

FIG. 3 is a simplified cross section through a two part mold 104,105. Mold half 104 has a cavity 106 that is milled out, leaving projections 107 on the molds which are hereafter called "islands" because on any given plane the cutter mills around them. The islands are shown schematically but are essential parts of the mold.

Geometric modeling systems provide the designer with the capability to model a mold or die and its cavity, or the cavity regions for molds and dies with optional islands, features, and avoidance and containment regions. In order for a design to be suitable for 2½ axis milling, on each z-level the tool must be constrained to mill only those regions interior to, or on the boundary of, the regions milled on higher z-levels. All molds and dies satisfy this requirement, which is why 2½ axis milling is used for most molds and dies. Maximum and minimum z-levels for section cuts are identified from the conglomerate of the regions designed, and appropriate z-levels for sectioning are calculated based on characteristics of the part and desired scallop height. If all sides of the cavity are vertical, a rapid dissent is possible. If smooth, sloped side surfaces are required, a gradual dissent is required.

If the model is correctly designed, each planar section through the solid model forms a closed curve with a complexity of nested and disjoint loops. The tool path optimization system being described imposes proper orientation on the aggregate of loops so the material to be removed by milling is encased between counterclockwise loops and clockwise loops. This implies that loops forming an outer boundary of the cavity must be counterclockwise, loops defining islands must have clockwise orientation, loops defining a "hole" in an island must have counterclockwise orientation, and so forth. Since the optimization method imposes the correct orientation on loops, there is no orientation requirement on solids as defined by the geometric modeler.

Figure 4:
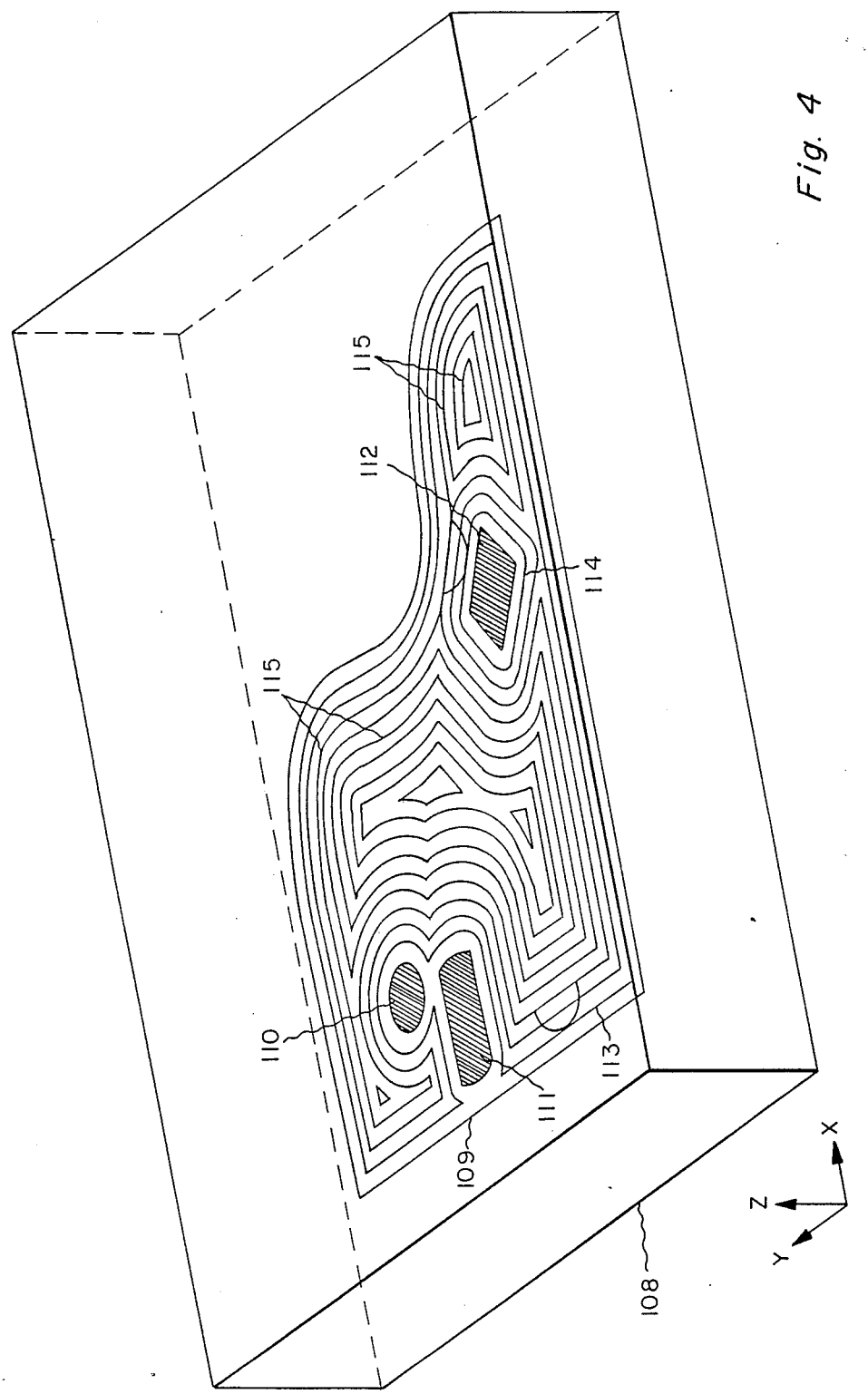
FIG. 4 shows the tool paths on a single z-level plane during the milling of a cavity from a rectangular slab.

FIG. 4 shows the tool paths on a single z-level plane during the milling of a cavity from a rectangular slab 108. The cavity boundary is indicated at 109 and there are three islands 110–112 that are not milled. The planar section cut through the solid model yields a closed curve comprising a cavity boundary loop 109 and three loops at the peripheries of islands 110–112. There are two finishing tool paths 113 and 114 both having tangential approach and exit arcs. According to the curve orientation convention that material to be removed is on the left, finishing path 113 is traversed in a counter-clockwise direction and finishing tool path 114 in a clockwise direction. All of the interior loops are roughing tool paths 115. The tool paths are formed by successive insets, which are offsets with negative offset size, of the closed curve and are processed through nesting and ordering optimization algorithms.

The following guidelines for ordering tool paths may be used by both algorithms, and were generated in consultation with milling machine operators who have programmed milling operations manually. They are given in order of priority, from the most important to less important.

1. Gouge free milling is required.
2. Prevent milling both sides of a path before milling the path itself.
3. Prevent over-milling, i.e. cutting part or all of a path more than once.
4. Mill paths that are innermost first unless previous guidelines affect this rule.
5. Paths closest to a boundary of a part (finishing paths) should:
   be milled separately from the roughing paths
   be augmented by tangential approach and exit
   be milled under user control for potential
   change in cutter diameter
6. Tool intersects the path to-be-milled only at its starting point. Tool paths can be reorganized to have a different starting point, if by so doing, a retraction is avoided.
7. Tool intersects no UNMILLED nest of tool paths.
8. Tool may cross MILLED nests of tool paths.

Figure 5:
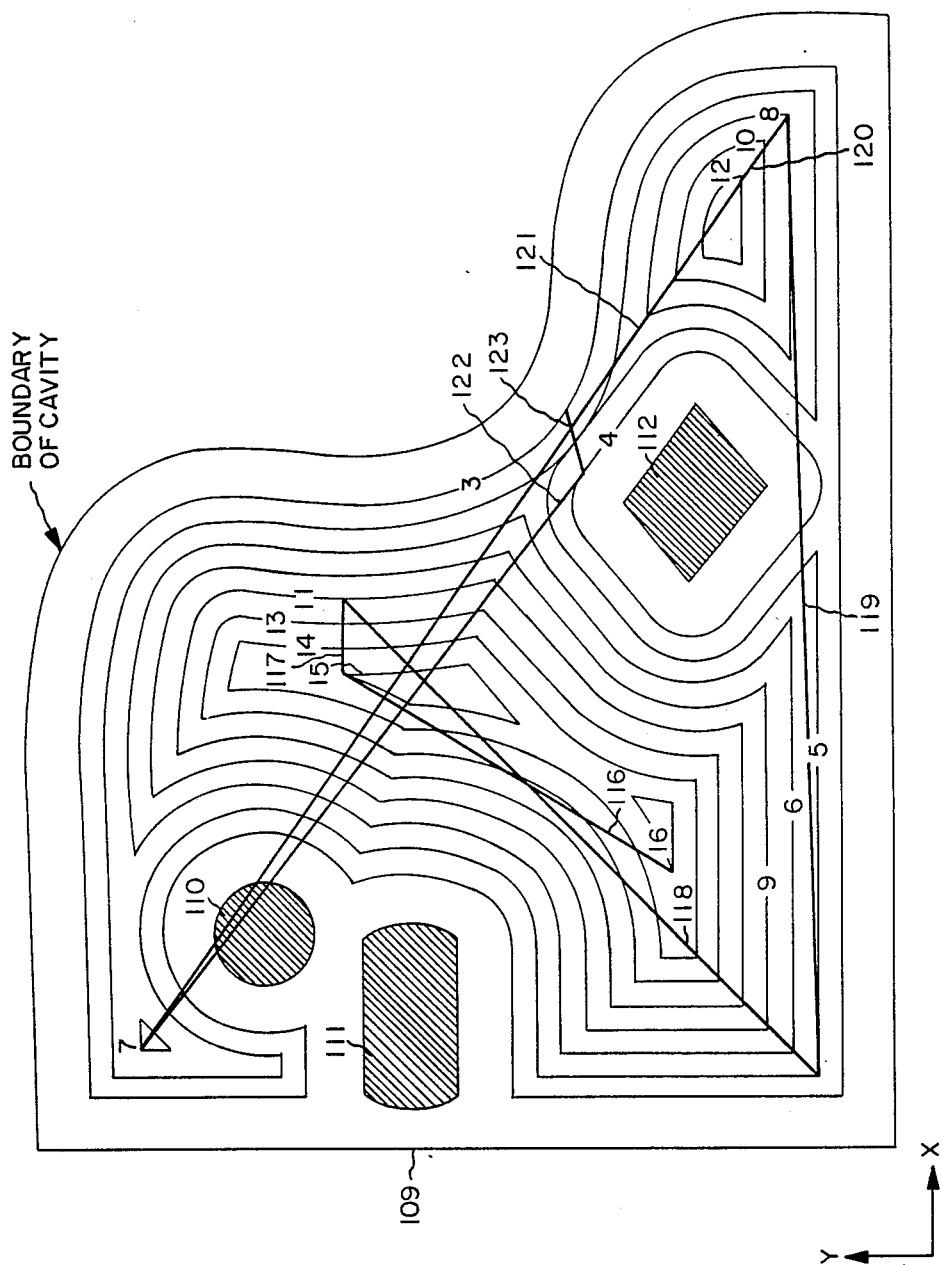
FIG. 5 shows the roughing tool paths to mill the cavity at the section in FIG. 4, ordered for optimized milling. The ordered list of tool paths, predrill coordinates, and nesting of tool paths are printed.

A summary of the nesting algorithm is given in paragraphs A, B, C and D and a discussion of how the. algorithm relates to FIG. 5 follows.

A. Validate the curve and impose proper loop orientation. Test to ascertain the section cut through the solid model has generated a closed curve, i.e. a set of loops that are either disjoint or properly nested to any depth. The loops may not touch nor intersect. Using the internal, cannonical form of the loops, identify the nesting and reorient individual loops to impose the convention of the material on the left.

B. Generate the milling region by using the offset radius of −(HRAD+THICK), as defined by the user, to obtain the first inset of the closed curve. Each of the n loops of this first inset are the finishing tool paths (113 and 114) and serve as a boundary curve across which the tool cannot move without gouging into the mold surface. The cannonical forms for each loop are stored, using an identifying number from 1 to n, so as to be available for intersection checks throughout the process.

C. Initialize the nest generated by the boundary loops, the finishing tool paths. Each counterclockwise (CCW) loop starts a positive nest of tool paths, and each clockwise (CW) loop starts a negative nest. Thus, loop 113 starts a positive nest and loop 114 starts a negative nest.

D. Repeatedly generate an inset curve at STEP-OVER distance from the previous inset. Each loop of the inset is stored on a disk using a consecutive number starting at (n+1) and is either assigned to an existing nest or is used to establish a new nest based on the milling and ordering guidelines provided above and the nesting logical criteria elaborated in Appendix B. CCW loops and CW loops are nested separately from one another.

Figure 6:
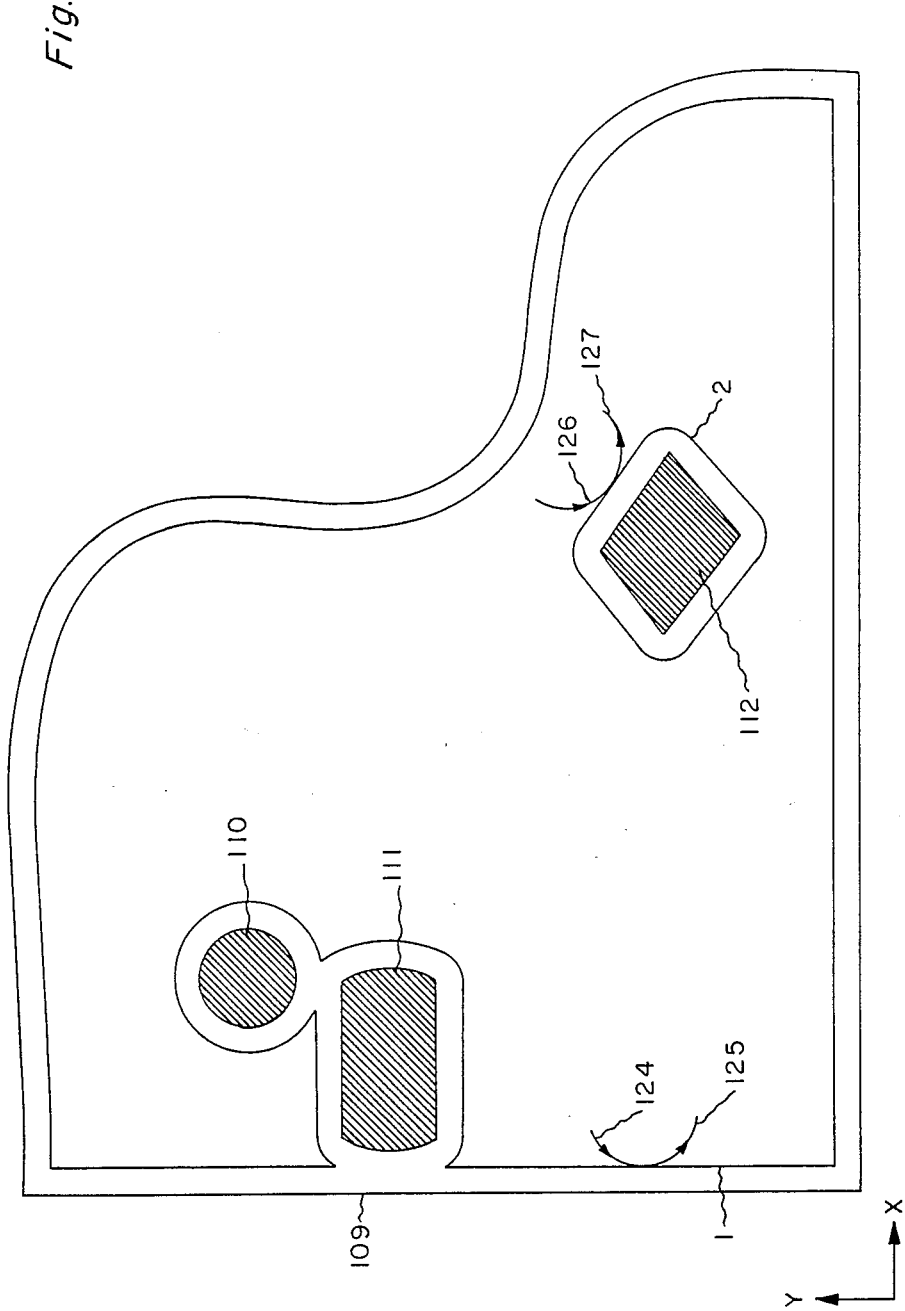
FIG. 6 shows the finishing tool paths for the section in FIG. 4 augmented with tangential approach and exit arcs.

FIG. 5 shows the roughing tool paths, numbered as paths 3–16, to mill a cavity around three islands at the same z-level as in FIG. 4, ordered for optimized milling. FIG. 6 shows separately the augmented finishing tool paths at the same level, here numbered paths 1 and 2. The generation and nesting of the roughing tool paths is done as is explained in Appendix B where the first three pages are an elaboration of the nesting algorithm. A simplified explanation of how the algorithm applies to FIG. 5 is given. Reference is made to the positive and negative nesting of tool paths listed at the side of the figure.

The first inset curve at STEPOVER distance from tool path 1, the finishing path, is loop 3 which follows the contour of cavity boundary 109 except where it follows the finishing path around islands 110 and 111. It is a counterclockwise loop and starts a positive nest of tool paths. The loops are numbered in sequence, so adding 1 to the previous loop count of 2 gives 3. The second inset curve yields loops 4 and 5 at the same time, but the first is a clockwise loop and is nested with the finishing path 2, and the second is a counterclockwise loop. A new positive, CCW nest is opened for loop 5 because it is found that loop 3 encloses both of loops 4 and 5. The third inset at STEPOVER distance yields three loops at the same time, loops 6, 7 and 8. Loop 6 is entirely inside loop 5 and does not enclose loop 4; therefore loop 6 is nested with loop 5. Loops 7 and 8, however, meet the criteria for starting new positive or CCW nests. The fourth inset produces loops 9 and 10; the first is added to the nest having loops 5 and 6 and the second to the nest with loop S. The fifth inset gives loops 11 and 12 which are respectively handled the same. The sixth and seventh insets yield loops 13 and 14 which are both added to the nest of loops 5, 6, 9 and 11. The eight inset produces loops 15 and 16; loop 15 is added to the same nest as loops 13 and 14. Loop 16 becomes a new positive nest because loop 14 encloses both of the new loops. In light of the loop numbering convention and the manner of generating tool paths by successive insets, the innermost tool paths are assigned the highest identification numbers. The process stops when the last inset curve has no arcs and is a null curve.

A summary of the algorithm to produce optimization of tool paths and dictate ordering throughout the process is given as paragraphs E, F, G, H and I. A discussion of how the algorithm relates to FIG. 5 follows. Throughout the algorithm, intersection checks are performed repeatedly. That functionality is implemented using computer subroutines. The correctness of these routines bear the responsibility of assuring gouge-free milling for surfaces. The interference logic generates the geometrical representation of the straight line tool motion from one roughing path to the next and determines that there is no intersection of it with the first inset curve, which has been identified as the non-augmented finishing paths, with an unmilled nest of tool paths, or with an about-to-be milled tool path except at a starting point. If these interference checks are not satisfied the algorithm attempts to reorganize the starting point of the tool path about to be milled.

E. The roughing loops in a nest are always used in the order specified in the nest, but can be used either top/down (outermost to innermost) or bottom/up (innermost to outermost). The direction is determined by the ordering guidelines specified above. The current position of the tool is known at all times. At the start of the process, the tool is in retract position so a plunge to the first point of the first loop chosen is required. Each time the tool is in retract position, the beginning point of the next tool path is retained as a predrill location.

F. The decision process must decide the next tool path to be used, either the next loop in the nest, if there is one, or the starting loop of another nest, and then whether or not linear motion from the current tool position to new start position in the next loop is safe without retraction of the cutting tool. The latter decision is made by the intersection subroutines, which test for intersections with the about-to-be milled tool path and with all the boundary loops (the finishing tool paths) and attempts reorganization of the about-to-be milled path when intersections occur. The effect of these subroutines, given on the first page of the optimization algorithms in Appendix B, is to determine tool clearance.

G. As these decisions are made, an ordered list is generated containing the identifying numbers of the loops in the order they are to be milled interspersed by −1, or another retraction symbol, indicating when a retraction of the cutting tool is necessary to prevent gouging.

H. Generate the geometric representation for all tool motion between roughing paths.

I. None of the boundary loops, i.e. the finishing tool paths, appear in the ordered list. They are stored on a disk during the nesting process and are finally augmented with tangential approach and exit arcs. The user has an opportunity to assign a different tool diameter for the augmentation of the finishing paths.

Referring to FIG. 5 and to the recommended ordering of the tool paths set forth below and to the optimization algorithm in Appendix B, the innermost tool path in an unprocessed nest is taken first, namely roughing tool path 16.

| RECOMMENDED ORDERING FOR LOOPS: −1 retraction | | | | | | | | | |
|---|---|---|---|---|---|---|---|---|---|
| 16 | −1 | 15 | 14 | 13 | 11 | 9 | 6 | 5 | −1 |
| 8 | 10 | 12 | −1 | 7 | −1 | 4 | 3 | −1 | |

| PRE-DRILL COORDINATES | | |
|---|---|---|
| SOURCE | X | Y |
| PK0016 | 1.057 | 0.820 |
| PK0015 | 1.780 | 2.024 |
| PK0008 | 3.887 | 0.370 |
| PK0007 | 0.370 | 2.755 |
| PK0004 | 2.541 | 1.153 |

| POSITIVE NESTING OF TOOL PATHS: | | | | | |
|---|---|---|---|---|---|
| 1 | 3 | 5 | 7 | 8 | 16 |
| | | 6 | | 10 | |
| | | 9 | | 12 | |
| | | 11 | | | |
| | | 13 | | | |
| | | 14 | | | |
| | | 15 | | | |

| NEGATIVE NESTING OF TOOLPATHS: |
|---|
| 2 |
| 4 |

The next innermost tool path is loop 15 which is in another positive nest. The intersection subroutines determine that there is no clear path from loop 16 to the beginning point of loop 15 and a retraction is necessary. Predrill locations are needed to plunge the cutting tool to mill loop 16 and to mill loop 15; the X and Y coordinates of the loop start points are stored. The straight line tool path 116 from the end point of loop 16 to the start of loop 15 for the tool in retracted position is generated and stored. The identifying numbers of the tool paths in the order they are to be milled is outputted and stored. The nest with loops 15-5 is milled bottom/up, innermost loop to outmost loop, following the ordering guidelines. The linear tool paths 117 and 118 to move the cutting tool from one roughing path to the next in the nest are generated in sequence and stored. The unprocessed nest with the innermost tool path, 12, is identified and it is determined that positive nest 12-B will be milled top/-down, outermost to innermost, because a milled tool path encloses this nest and the guideline as to not milling both sides of a path before milling the path itself would be violated. An interference check shows that there is no clear path from loop 5 to loop 8, and a retraction is unavoidable. The value −1 is added to the ordered list of tool paths and the straight line tool motion path 119 is produced and stored for the tool in retracted position.

The positive nest 12-B is ordered such that tool paths 8, 10 and 12 are to be milled in that sequence and the linear motion paths 120 from roughing path 8 to 10 and 10 to 12 are generated on the milling plane. The unprocessed nest with the innermost tool path is now loop 7. A retraction is essential to go from loop 12 to loop 7 because the tool would intersect a boundary loop. The value −1 is added to the output list and linear retracted motion 121 is generated. Tool path 4 becomes the innermost tool path in an unprocessed nest; this is a negative nest which is always taken bottom/up to assure that loops away from the finishing tool paths are milled first. Loop 2 is a finishing tool path and is not taken after loop 4. A retraction is necessary to go from loop 7 to loop 4 and straight line motion path 122 is generated. Loop 3 is now the innermost unmilled tool path. The optimization algorithm reorganizes loop 3 and its starting point so as to allow safe tool motion between negative loop 4 and positive loop 3 without retraction. Straight line path 123 is produced.

The procedure for augmenting finishing tool paths 1 and 2, FIG. 6, is given on the last two pages of Appendix B. The first has tangential approach and exit arcs 124,125 and the second arcs 126,127. Fairly long arcs are easier to fit; if these tool paths cannot be augmented a smaller tool could be used or the tool could plunge to a start point. The approach and exit arcs are preferably quarter circles with a large radius. The geometric representation of the finishing tool paths augmented by these two arcs is reconstructed. Their starting and end points are such that the approach and exit paths are always internal to the roughing region, and predrilling is not required. If cavity boundaries do not allow sufficient clearance for the augmentation of the finishing path, the path is not augmented.

Figure 7:
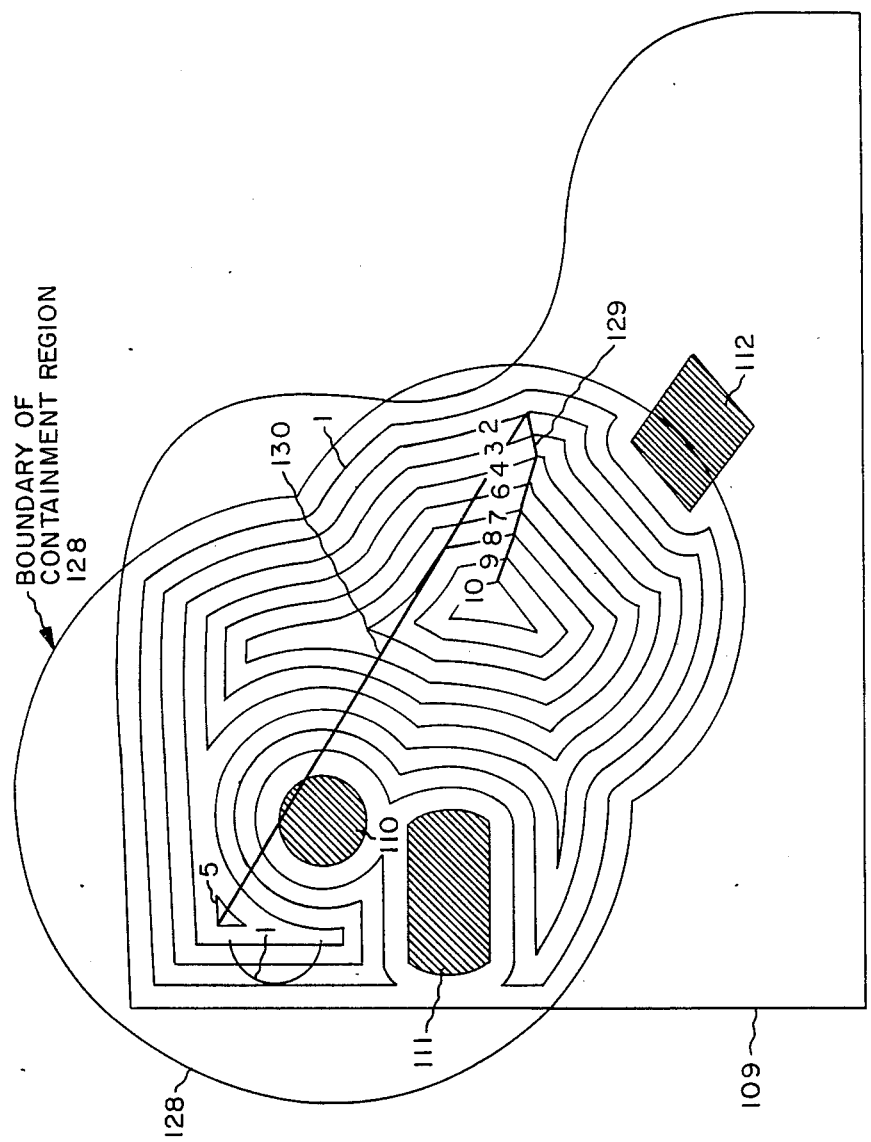
FIG. 7 shows a containment region imposed on the milling process of the cavity illustrated in FIGS. 4–6, and the reordered tool paths.

FIG. 7 shows a containment region of arbitrary shape imposed on the milling process of the mold cavity shown in FIGS. 5 and 6. The boundary of the containment region is indicated at 12B. Finishing tool path 1 and roughing tool paths 2-10 are confined to the milling region which is that area common to both the cavity and the containment region. There are two positive nests of tool paths, and the recommended order for optimized milling of the tool paths is printed below.

| RECOMMENDED ORDERING FOR LOOPS: −1 retraction | | | | | | | | | |
|---|---|---|---|---|---|---|---|---|---|
| 10 −1 | 9 | 8 | 7 | 6 | 4 | 3 | 2 | −1 | 5 |

| POSITIVE NESTING OF TOOL PATHS: | |
|---|---|
| 1 | 5 |
| 2 | |
| 3 | |
| 4 | |
| 6 | |
| 7 | |
| 8 | |
| 9 | |
| 10 | |

NO NEGATIVE NESTS .

After milling one positive nest there is a mandatory retraction of the cutting tool before milling loop 5. The straight line tool motion paths between the roughing tool paths are indicated at 129 and 130. There are two predrill locations, at the start points of roughing tool paths 10 and 5.

Figure 8:
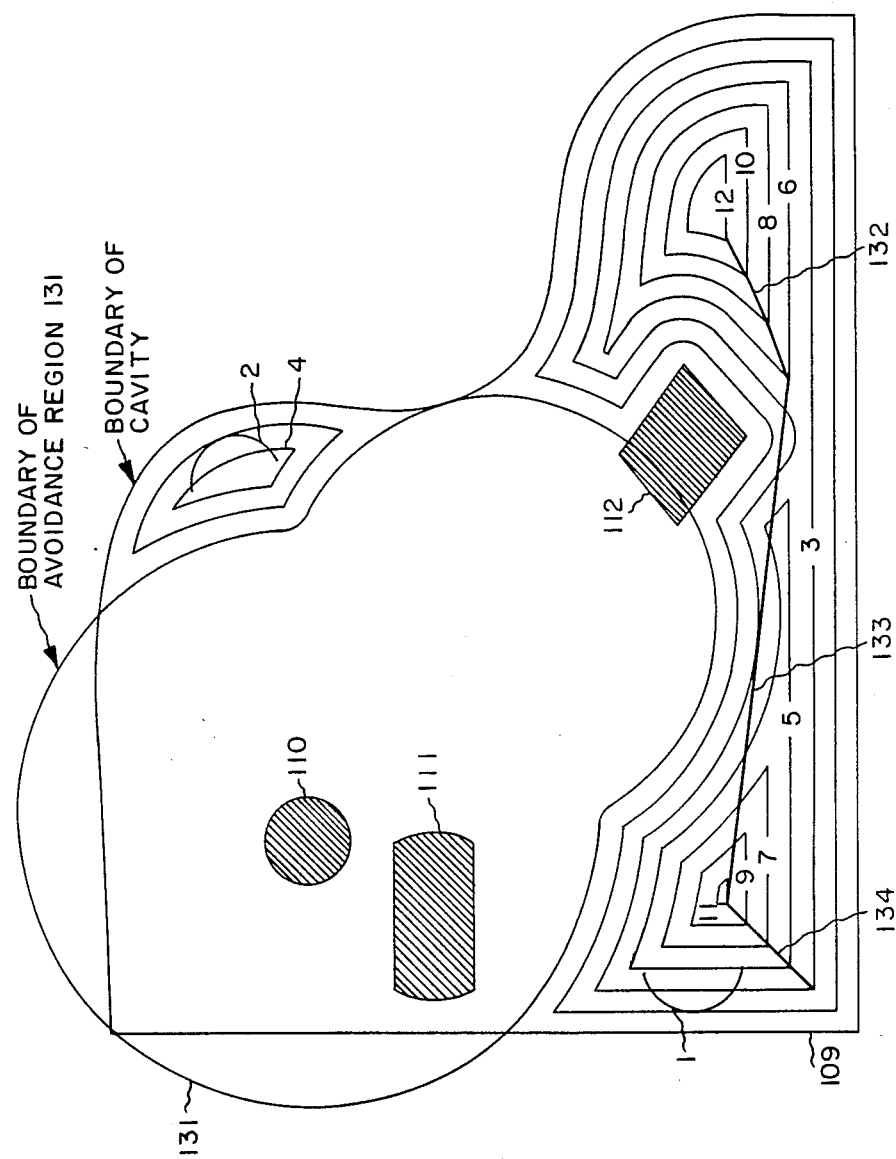
FIG. 8 shows the same section and the optimization of tool paths to mill those portions of the cavity outside the boundary of an avoidance region.

FIG. 8 shows the optimization of tool paths to mill those portions of a cavity outside the boundary of an avoidance region 131. The milling region in this case is the mold cavity having boundary 109 from which is subtracted the avoidance region. Following the same nesting and optimization methods already discussed, the optimized order for milling the roughing tool paths, which is set forth below, is the nest comprising paths 12, 10, 8 and 6, after which there is a required retraction before milling paths 11, 9, 7, 5 and 3. A retraction is made before proceeding to path 4.

| RECOMMENDED ORDERING FOR LOOPS: −1 retraction | | | | | | | | | |
|---|---|---|---|---|---|---|---|---|---|
| 12 −1 | 10 4 | 8 −1 | 6 | −1 | 11 | 9 | 7 | 5 | 3 |

| POSITIVE NESTING OF TOOLPATHS: | | |
|---|---|---|
| 1 | 2 | 6 |
| 3 | 4 | 8 |
| 5 | | 10 |
| 9 | | 12 |
| 11 | | |

NO NEGATIVE NESTS

Finishing paths 1 and 2 are augmented with approach and exit arcs and are milled at the end. Straight line tool motion paths 132-134 are generated to provide for tool movement from a roughing path to the next. Despite the vastly different milling regions in FIGS. 5-8 and the radical change in the arrangement of the tool paths, the ordering optimization method is successful in providing for optimized machining.

Figure 9:
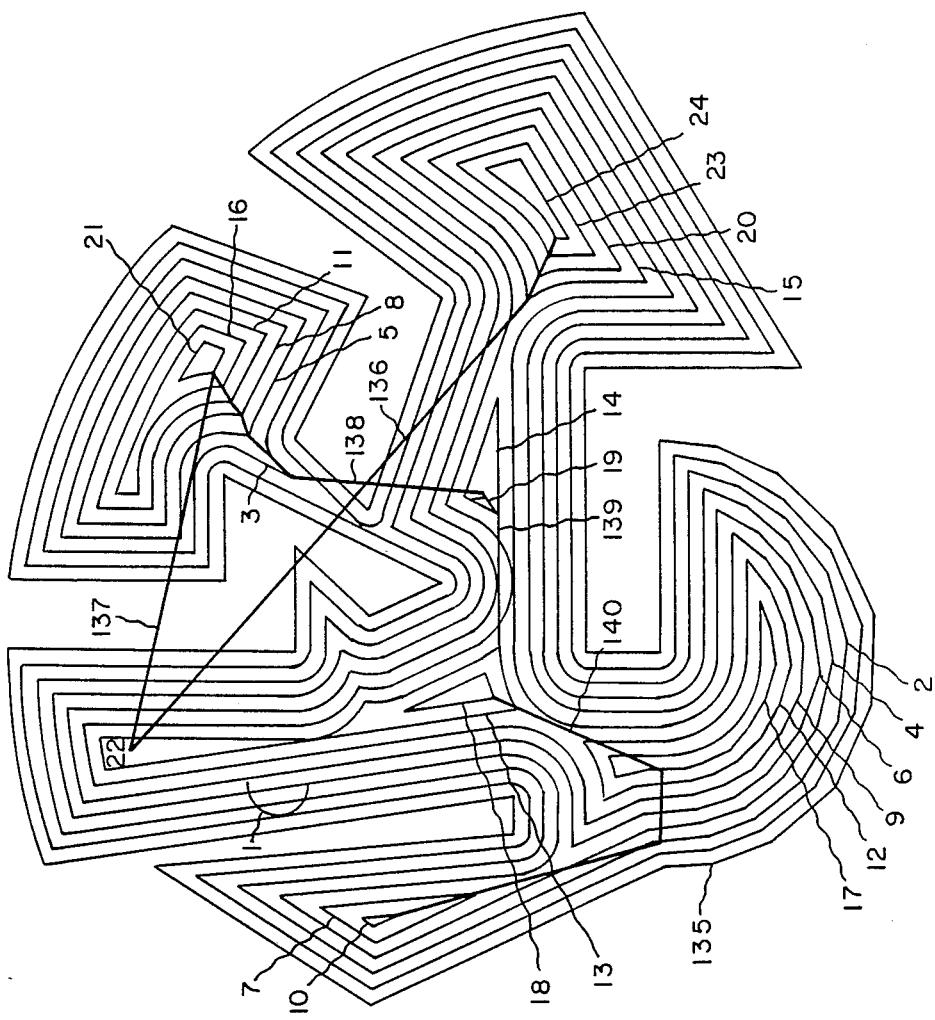
FIG. 9 is an example of optimized tool path organization for a cavity having deeply concave recesses and a narrow stricture.

FIG. 9 provides an example of optimized tool path organization, as set forth below, for a cavity having deeply concave recesses and a narrow stricture.

| POSITIVE NESTING OF TOOLPATHS: | | | | | | |
|---|---|---|---|---|---|---|
| 1 | 3 | 7 | 13 | 14 | 15 | 22 |
| 2 | 5 | 10 | 18 | 19 | 20 | |
| 4 | 8 | | | | 23 | |
| 6 | 11 | | | | 24 | |

-continued

| | |
|---|---|
| 9 | 16 |
| 12 | 21 |
| 17 | |

NO NEGATIVE NESTS

RECOMMENDED ORDERING FOR LOOPS:
−1 retraction

| | | | | | | | | |
|---|---|---|---|---|---|---|---|---|
| 24 | 23 | 20 | 15 | −1 | 22 | −1 | 21 | 16 | 11 |
| 8 | 5 | 3 | −1 | 19 | 14 | −1 | 18 | 13 | −1 |
| 17 | 12 | 9 | 6 | 4 | 2 | 7 | 10 | −1 | |

Such features offer no difficulty for the optimization method. The boundary of the molding cavity is designated 135. Path 1 is the single finishing tool path and paths 2-24 are the roughing tool paths. The linear tool motion paths following retraction to get to the starting point of a next roughing path are designated 136-140.

Figure 10:
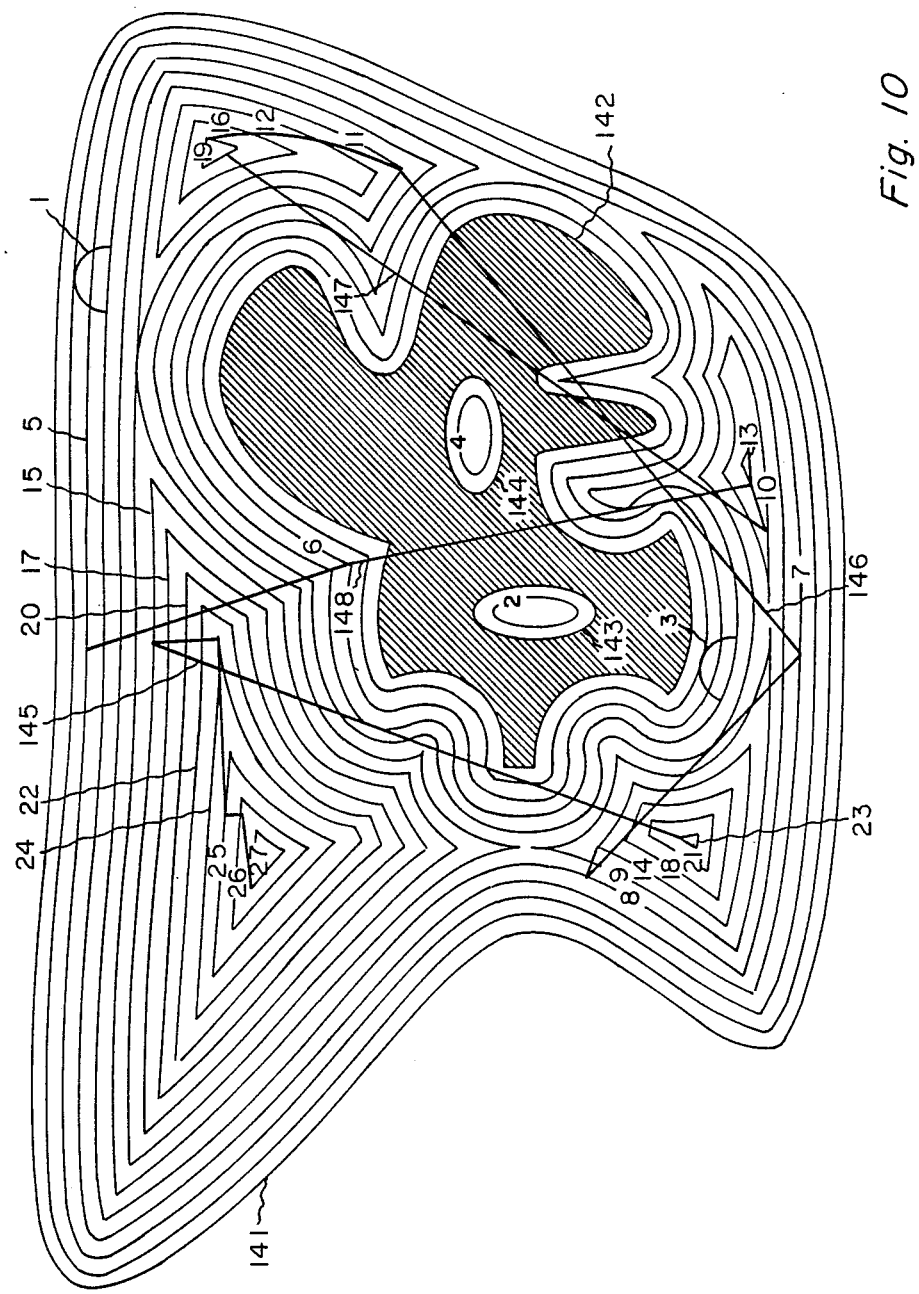
FIG. 10 shows tool paths during the milling of one plane of a cavity having a more complicated configuration.

FIG. 10 shows tool motion during the milling of a more complicated configuration of the milling cavity having a boundary 141 and island 142, and two holes 143 and 144 within the island. There are four finishing tool paths 1-4 and twenty-three roughing paths 5-27. The recommended ordering for the loops is printed below; there are only five required retractions.

POSITIVE NESTING OF TOOL PATHS:

| | | | | | | | |
|---|---|---|---|---|---|---|---|
| 1 | 2 | 4 | 5 | 7 | 10 | 11 | 15 |
| | | | | 8 | 13 | 12 | 17 |
| | | | | 9 | | 16 | 20 |
| | | | | 14 | | 19 | 22 |
| | | | | 18 | | | 24 |
| | | | | 21 | | | 25 |
| | | | | 23 | | | 26 |
| | | | | | | | 27 |

NEGATIVE NESTING OF TOOLPATHS:

| |
|---|
| 3 |
| 6 |

RECOMMENDED ORDERING FOR LOOPS:
−1 retraction

| | | | | | | | | | |
|---|---|---|---|---|---|---|---|---|---|
| 27 | 26 | 25 | 24 | 22 | 20 | 17 | 15 | −1 | 23 |
| 21 | 18 | 14 | 9 | 8 | 7 | −1 | 11 | 12 | 16 |
| 19 | −1 | 10 | 13 | −1 | 6 | 5 | −1 | | |

Straight line tool motion paths after a retraction to get to the next loop are shoWn at 145-148. Tool motion paths to get from one loop to the next in a nest are unnumbered in both Figs. 9 and 10.

The guidelines and algorithms to generate an optimized ordering of 2-D tool paths for 2½-axis milling of cavities for molds or dies have been presented. The optimized tool path generation method dictates all motion for the milling tool, and reduces the number of retractions to the minimum number possible within the guidelines. It specifies predrill locations for tool plunges. In addition, it incorporates mechanisms for handling optional avoidance and containment regions of arbitrary shape.

These optimization principles can be extended to accomplish highly efficient profile milling. In principle, the techniques can be extended to three and five axis milling.

While the invention has been particularly shown and described with reference to preferred embodiments thereof, it will be understood by those skilled in the art that various changes in form and details may be made without departing from the spirit and scope of the invention as defined in the appended claims.

APPENDIX A
DEFINITION OF TERMS USED

| | |
|---|---|
| arc - | a parametric, rational cubic parameterized from 0.0 to 1.0 |
| curve - | a collection of arcs. |
| null curve - | curve with no arcs. |
| loop - | a collection of n arcs such that the last point of arc i is identical with the first point of arc i+1, for i=1,2, . . . ,n−1, and the last point of arc n is identical with the first point of arc 1. No other arc intersections are allowed, i.e. a loop is a continuous, nonselfintersecting, closed chain of arcs which defines an area. |
| beginning point of a loop - | since a loop has a cannonical representation internal to the computer, the beginning point of the first arc in this geometric representation is the beginning (and ending point) of the loop. No assumption can be made that consecutive arcs of the loop are stored continuously in the geometric representation. |
| disjoint loops - | loops with no area in common. In FIG. 2, loops A,B,C and D are disjoint from loops E and F. |
| nested loops - | a set of loops that for each pair one is completely inside the other. Considering the pair of loops A-D in FIG. 2, loop D is nested inside loop A and loop A encloses D. |
| closed curve - | set of nested and/or disjoint loops. It may have loops inside loops to any depth. The loops shown as FIG. 2 represents a closed curve. |
| orientation of a loop - | the direction (either clockwise or counterclockwise) traveled along that loop as consecutive arcs are traversed. |
| Proper curve orientation - | requires the outermost loop(s) to have counterclockwise (CCW) orientation, requires the loops defining islands to have clockwise (CW) orientation, requires the loops defining holes in the islands to have CCW orientation, etc. This convention is defined so as to be able to identify the location of the material to be removed by milling. As a point traverses a loop with proper orientation, |

-continued

APPENDIX A
DEFINITION OF TERMS USED

| | |
|---|---|
| | the material to be removed is on the left. |
| offset curve - | curve whose points are a fixed distance (plus or minus a small tolerance) from a specified curve. In general, if the offset distance is negative, offsets of CCW loops have smaller area than the original loops, or may not exist because the area within the loop is too small, or may break up into several CCW closed loops. Negative offsets of CW loops have greater area than the original loops, or may not exist if there is insufficient room between this CW loop and nearby CCW loops, or may break up into several CW loops. |
| minimum box around a 2D arc - | smallest rectangle with sides parallel to the coordinate axes that encloses the 2D arc. |
| minimum box around a 2D loop - | smallest rectangle with sides parallel to the coordinate axes that encloses the 2D loop |
| a CCW nest - | a list of CCW loops such that each loop (except the first) in the list is entirely enclosed by its predecessor. A CCW nest may consist of a single CCW loop. |
| a CW nest - | a list of CW loops such that each loop (except the first) in the list entirely encloses its predecessor. A CW nest may consist of a single CW loop. |
| an open CCW nest - | a CCW nest to which CCW loops can be added. |
| an open CW nest - | a CW nest to which CW loops can be added |
| a closed CCW nest - | CCW nest to which no more CCW loops can be added. |
| a closed CW nest - | CW nest to which no more CW loops can be added. |
| augment finishing curve with tangential approach and exit arcs - | generate arcs that define portions of a circle that is exactly tangent to the midpoint of one of the arcs of the finishing curve. Reorganize the finishing curve to generate an augmented curve which has the tangential approach portion of the circle, followed by the second half of the starting arc, followed by each consecutive arc of the curve, followed by the first half of the starting arc, followed by the tangential exit portion of the circle. |

APPENDIX B

ELABORATION OF NESTING AND OPTIMIZING ALGORITHMS

I  NESTING ALGORITHM

```
        Assign the name CLCURV to the curve obtained from the section
           cut.  Validate CLCURV and impose proper orientation on each
           loop so material to be milled is on left

FIRSTSTEP <----    - (HRAD + THICK)

OCURVE <----   the trimmed curve obtained by offsetting CLCURV
                       at the distance FIRSTSTEP OCURVE is defined to be the 'BOUNDING CURVE'

Each loop of OCURVE is a finishing curve which is
               to be augmented with tangential approach and
               exit.  Store each loop on disk as separate
               curve, FC0001, FC0002, etc. to be augmented later
               Store the number of finishing loops as NFIN.
```

The loops of OCURVE are the boundaries that no tool
    path may cross. For use with intersection checks
    later, store:
        the beginning (and end) point of each loop
        the number of islands (i.e. CW loops) and the
            minimum box around each
        the cannonical form of arcs forming each island.
            These form the geometries describing the first
            CW nests
        the number of outer loops (i.e. CCW loops) and the
            minimum box around each
        the cannonical form of arcs forming each outer
            boundary. These form the geometries describing
            the first CCW nests loopcount <---- number of loops in OCURVE (the bounding curve)
poscount  <---- number of CCW nests generated from OCURVE
negcount  <---- number of CW nests generated from OCURVE
initialize the length of each nest to 1

Initialize: offset size <----   - (FIRSTSTEP + STEPOVER)

Generate   LCURVE  = trimmed offset curve of the original
                    CLCURV with offset size as initialized DO UNTIL LCURVE is the null curve:
  FOR each loop of LCURVE:
      add 1 to loopcount (this incremented number is to be
          associated with the loop)
      store loop on disk as PK000n where n is the loopcount
      identify the trail of arcs that form the loop
      store beginning point of loop
      if the loop is CCW loop:
          if the loop is entirely inside existing OPEN CCW
              nest #k then
                  determine whether or not CCW NEST #k encloses
                      other loops of LCURVE as well.
                  If so,
                      mark CCW nest #k as closed
                      add 1 to poscount
                      open new CCW nest #poscount for the current
                          CCW loop
                      store the cannonical form of arcs of this
                          new nest
                      store dimensions of minimum box for new nest
                      initialize the length of the new nest to 1
                  else
                      add 1 to the length of nest #k
                      add the current CCW loop to CCW nest #k.
                  endif
          else
              add 1 to poscount
              open a new CCW nest #poscount for the current CCW
                  loop
              store the cannonical form of arcs of this new nest
              store dimensions of minimum box for new nest
              initialize the length of the new nest to 1
          endif
      else (it is a CW loop)
          if the loop surrounds existing OPEN CW nest #k then
              add the current CW loop to CW nest #k
          else

```
                    add 1 to negcount
                    open a new CW nest #negcount for the current CW
                        loop
                    store the cannonical form of arcs of this new nest
                    store dimensions of minimum box for new nest
                    initialize the length of the new nest to 1
                endif
            endif
        end of FOR logic.

subtract STEPOVER from offset size generate LCURVE  = the trimmed offset curve of the original
                           CLCURVE at this new offset size end of DO UNTIL logic.
```

Nesting logic summary:

The finishing loops are stored on disk with names FC0001, FC0002, etc.
  There are NFIN of them.

The cannonical form of each loop other than the finishing loops has been
  stored on disk with name PK000n where n is its identifying number.
  The value for n starts at NFIN + 1.

The identifying number of every loop (the FC... loops and the PK... loops)
  appears exactly once in a nest.

The number of positive nests is poscount.

The number of negative nests is negcount.

The positive nests (i.e. the CCW nests) are arranged so that the topmost
loop in the nest encloses every other loop in that nest, the second loop
encloses all but the first in the list, and so forth.

The negative nests (i.e. the CW nests) are arranged so that the topmost
loop in the nest is enclosed by every other loop in that nest, the second
loop is enclosed by all but the first in the list, and so forth.

The length of each CCW nest (i.e. how many loops have been added to this
    positive nest) is known The length of each CW nest (i.e. how many loops have been added to this
    negative nest) is known Because of the loop naming convention and the manner used to generate tool
    paths (successive insetting of the original curve) the innermost tool
    paths are those which have been assigned the highest identification
    number.

II  Optimization

A. Introduction

After generating nests of tool paths, it still is not obvious in what
order the nests should be taken, and after choosing the nest, a decision
must be made whether to take the nest from bottom up or from top down.
Even within a single nest, there is no assurance that the tool can pro-
ceed from the end point of a loop to the beginning point on the next
loop without intersecting the unmilled loop. Intersection checks
must be performed repeatedly.

Guidelines for milling were provided earlier.

B. Subroutines

Intersection checks are performed repeatedly and are generated as subroutines. The correctness of these routines bear the responsibility of assuring gouge free milling and for determining that tool motion does not cross boundaries of unmilled nests. The loop boundaries and the boundaries of the nests were carefully stored during the nesting procedure.

| Identifying name | function |
| --- | --- |
| CLEAR MOVE | Does the straight line path from end point of loop#i to the beginning point of loop#j intersect loop#j at any point other than the beginning point |
| CLEAR OVER | Does the straight line path from end point of loop#i to the beginning point of loop#j intersect any arc of the bounding curve (see nesting algorithm for definition of the 'BOUNDING CURVE') or the largest enclosing boundary of any unmilled nest |
| TRY TO REORGANIZE | Either<br>   reorganize the tool path about to be milled so as to have a starting point such that the straight line tool motion between the last end point and the new starting point intersects the about-to-be milled path at the starting point only, intersects no arc of the bounding curve, and intersects no unmilled nest. Store the reorganized form of the tool path on disk, replacing the the former representation<br>or<br>   return NOTCLEAR = true. |

C. Roughing Optimization Algorithm

Initialize:

```
LASTLOOP = 0      (identifying number of last loop processed. This
                   identifies current location of tool)
NOUT     = 0      (number of entries in output list)
NPRE     = 0      (number of predrill points)
MARK all nests as unprocessed.
```

DO UNTIL all nests have been processed:

Identify which unprocessed nest has the innermost tool path. It is sufficient to check the last entry in each nest. Call it nest #k. Process nest #k and mark it as processed.

IF nest #k is a positive nest, then

```
if      lastloop > 0
   and  top loop in nest #k is not a boundary loop
   and  any previously positive milled nest encloses nest #k
   then
           take nest #k top/down
           This assures both sides of a loop will not be milled
              before the loop itself.
           Process only NONFINISHING loops.
   else
      take nest #k bottom/up.
              This is the general case, and assures
              the guideline of milling innermost loops first.
              Process only NONFINISHING loops.
   endif If lastloop = 0
      add 1 to NPRE
      store beginning point of first loop as predrill point
   else
      Generate the geometric representation of the line from current
      tool position (end point of lastloop) to beginning of
      first loop to be used.  Here the tool motion is between nests.

DETERMINE CLEARANCE for linear tool motion.

If NOT CLEAR,
         add 1 to NOUT
         store the value -1 in output list at position NOUT
         add 1 to NPRE and store loop start point as predrill location
      endif
   endif Add 1 to NOUT.
   Store the identifying number of first loop being used.

FOR each other NONFINISHING loop in the nest:
      Generate the geometric representation of the line from current
      tool position (end point of last loop milled) to beginning of
      loop.  Here the tool motion is within a nest.

DETERMINE CLEARANCE for linear tool motion.

If NOT CLEAR, (motion here is within a nest)
         reorganize the about-to-be milled loop testing start points
         and midpoints of arcs to find a suitable starting point that
         avoids tool motion across the about-to-be milled path.
         if failure,
            add 1 to NOUT
            store the value -1 in output list at position NOUT
            add 1 to NPRE and store loop start point as predrill
               location
         endif
      End if Add 1 to NOUT.
      Store the identifying number of current loop at position NOUT
      lastloop <----  identifying number of current loop
   End FOR loop ELSE   (nest is a negative or CW loop)

Negative nests are always taken bottom/up, which assures that
         loops away from the boundary are milled first.  Process
         only NONFINISHING loops.
```

```
If lastloop = 0
   add 1 to NPRE
   store beginning point of first loop as predrill point
else
   Generate the geometric representation of the line from current
   tool position (end point of lastloop) to beginning of
   first loop to be used.  Here the tool motion is between nests.

DETERMINE CLEARANCE for linear tool motion.

If NOT CLEAR,
      add 1 to NOUT
      store the value -1 in output list at position NOUT
      add 1 to NPRE and store loop start point as predrill location
   endif
   Add 1 to NOUT.
   Store the identifying number of first loop being used.

FOR each other NONFINISHING loop in the nest:
      Generate the geometric representation of the line from current
      tool position (end point of last loop milled) to beginning of
      loop.  Here the tool motion is within a nest.

DETERMINE CLEARANCE for linear tool motion.

If NOT CLEAR, (motion here is within a nest)
         reorganize the about-to-be milled loop testing start points
         and midpoints of arcs to find a suitable starting point that
         avoids tool motion across the about-to-be milled path.
         if failure,
            add 1 to NOUT
            store the value -1 in output list at position NOUT
            add 1 to NPRE and store loop start point as predrill
               location
         endif
      End if Add 1 to NOUT.
      Store the identifying number of current loop.
      lastloop <---- identifying number of current loop
   End FOR loop
End IF
END DO UNTIL D.  Augmentation of Finishing Tool Paths FOR i = 1, 2, ..., NFIN Get curve FC000i from disk.  (We know this is a single loop)

Radius = 2.0 * HRAD   (HRAD = radius of cutter)

Determine chordal length of each arc.  Attempt augmentation
         at midpoint of arcs starting with longest chordal length
         to shortest, until success or every arc has been tried Find midpoint of arc.  Use point/tangent data at midpoint to
         construct circle tangent to arc with desired radius,
         whose center is inside the finishing curve.

Test the arcs forming the hemisphere tangent to the curve for
         intersection with the curve.  An intersection at any
         point other than the tangent point indicates the aug-
         mentation can not be made starting with this arc.
```

```
        Using a quarter circle for the approach arc and the following
           quarter circle for the exit arc, reconstruct the geo-
           metric representation of the finishing curve augmented
           by these two arcs. Some preference might exist for
           dividing the appoach and exit arcs into two pieces.
    If success
            store augmented curve on disk with name FINC0001
    Else
            store input curve on disk with name FINC0001
    End IF End FOR loop.
```

What is claimed is:

1. A method of generating optimized tool paths for milling mold and die parts with a cutting tool comprising:
   providing a three-dimensional solid model of a part cavity to be milled, taking a planar section through said model and obtaining a closed curve which describes boundaries of said cavity and has a plurality of loops oriented such that material to be cut is on the left;
   deriving a first inset curve at a given distance from said closed curve each loop of which is a finishing tool path across which said tool cannot move without gouging and each starting a nest of tool paths;
   repeatedly generating other inset curves at a constant distance from a previous inset curve every loop of which is a roughing tool path and is a member of one nest or starts a new nest, numbering all of said roughing tool paths in sequence, and stopping when a last inset curve has no arcs;
   ordering said roughing tool paths in an optimized sequence to mill said cavity so as to follow a prechosen set of ordering guidelines while minimizing retraction of said tool to go to another roughing tool path, and generating tool motion paths to move between said roughing tool paths; and
   augmenting said finishing tool paths with tangential approach and finish routes.

2. The method of claim 1 further comprising generating a list of predrill locations at starting points of said tool paths where said cutting tool plunges from a retracted position.

3. The method of claim 1 wherein said numbering comprises assigning highest numbers to innermost tool paths.

4. The method of claim 3 which further comprises generating an ordered list of said tool path numbers in the order to be milled separated by a retraction symbol where required to prevent gouging.

5. The method of claim 4 wherein said nest of tool paths are milled from innermost to outermost unless one of said guidelines is violated.

6. The method of claim 4 wherein said tool motion paths between roughing tool paths are straight lines.

7. The method of claim 4 wherein said ordering said roughing tool paths is an optimized sequence comprises making interference checks to determine that there is no intersection with said first inset curve and with an unmilled nest of tool paths and with an about-to-be milled tool path except at a starting point.

8. The method of claim 1 wherein said set of ordering guidelines are that (a) gouge free milling is required, (b) prevent milling both sides of one tool path before milling the tool path itself, (c) prevent cutting all or part of one tool path more than once, (d) mill the tool paths that are innermost first, (e) finishing tool paths are milled separately from roughing paths and last, (f) the tool intersects the path-to-be milled only at a starting point, (g) the tool intersects no unmilled nest of tool paths, and (h) the tool may cross milled nest of tool paths.

9. The method of claim 1 wherein the distance of said first inset curve from said closed curve is equal to the radius of said cutting tool plus a prescribed thickness to be left on a surface of the part.

10. The method of claim 1 wherein there is a containment region to which milling is restricted and said providing a three-dimensional solid model comprises modeling the containment region and intersecting with a model of said part cavity to thereby form a milling region.

11. The method of claim 1 wherein there is an avoidance region where milling is prohibited and said providing a three dimensional solid model comprises modeling the avoidance region and subtracting from a model of said part cavity to thereby form a milling region.

12. The method of claim 1 further comprising repeating the foregoing steps beginning with taking a planar section and generating optimized two-dimensional tool paths at other levels of said part cavity.

13. A method of generating optimized tool paths for milling molds and dies with a cutting tool comprising:
   providing a three-dimensional solid model of a part cavity and of any containment and avoidance regions to which milling is respectively restricted and is prohibited, and forming a milling region by intersecting said cavity and any containment region and subtracting therefrom any avoidance region; taking a planar section through said milling region and obtaining a closed curve which describes boundaries of said milling region and has a plurality of loops oriented such that material to be cut is on the left;
   deriving a first inset curve at a given distance from said closed curve each loop of which is a finishing tool path across which said tool cannot move without gouging and each starting a nest of tool paths, and numbering every finishing tool path in sequence;
   repeatedly generating other inset curves at a constant distance from a previous inset curve each loop of which is a roughing tool path and is a member of one nest or starts a new nest, numbering said roughing tool paths in sequence such that the innermost path has the highest number, and stopping when a last inset curve has no arcs;

ordering said roughing tool paths in an optimized sequence to mill said cavity so as to follow a pre-chosen set of ordering guidelines while minimizing the number of retractions of said tool to mill a next tool path, outputting a list of said tool paths in the order to be milled separated by a retraction indication, and generating straight line tool motion paths to move to the next tool path; and augmenting said finishing tool paths with tangential approach and finish arcs.

14. The method of claim 13 further comprising generating a list of predrill locations at starting points of said tool paths where said cutting tool plunges from a retracted position.

15. The method of claim 14 wherein said ordering tool paths in an optimized sequence comprises making interference checks to determine that there is no intersection with said first inlet curve and with an unmilled nest of tool paths and with an about-to-be milled tool path except at the starting point.

16. The method of claim 13 wherein said set of ordering guidelines are that (a) gouge free milling is required, (b) prevent milling both sides of one tool path before milling the tool path itself, (c) prevent cutting all or part of one tool path more than once, (d) mill the tool paths that are innermost first, (e) finishing tool paths are milled separately from roughing paths, and last, (f) the tool intersects the path-to-be milled only at a starting point, (g) the tool intersects no unmilled nest of tool paths, and (h) the tool may cross milled nest of tool paths.

17. The method of claim 13 further comprising repeating the foregoing steps beginning with taking a planar section and generating optimized two-dimensional tool paths at other levels of said part cavity.

* * * * *